United States Patent [19]

Owsen

[11] Patent Number: 5,730,453
[45] Date of Patent: Mar. 24, 1998

[54] NON-TIPPING TRICYCLE

[76] Inventor: Peter Owsen, 18831 Bainbridge Ct., Livonia, Mich. 48152

[21] Appl. No.: 519,826
[22] Filed: Aug. 25, 1995
[51] Int. Cl.$^6$ ................................................ B62K 5/04
[52] U.S. Cl. .................... 280/282; 280/261; 280/266; 280/112.2; 474/135; 474/63
[58] Field of Search ........................ 280/266, 282, 280/240, 259, 112.2, 261; 474/134, 135, 60, 63

[56] References Cited

U.S. PATENT DOCUMENTS

| 3,592,487 | 7/1971 | Mansperger | 280/282 |
| 3,696,681 | 10/1972 | Fetter et al. | 474/62 |
| 3,698,502 | 10/1972 | Patin | 280/282 |
| 4,132,435 | 1/1979 | Wilson | 280/282 |
| 5,240,267 | 8/1993 | Owsen | 280/240 |
| 5,568,935 | 10/1996 | Mason | 280/266 |

FOREIGN PATENT DOCUMENTS

| 6-94091 | 4/1994 | Japan | 474/134 |
| 686503 | 1/1953 | United Kingdom | 474/134 |

Primary Examiner—Brian L. Johnson
Assistant Examiner—Avraham Lerner
Attorney, Agent, or Firm—Charles W. Chandler

[57] ABSTRACT

A tricycle has two non-steerable rear wheels and a single steerable front wheel. One of the rear wheels is driven by a chain-sprocket drive system that includes a drive sprocket mounted on a front frame and a driven sprocket mounted on a rear frame. The front frame is tiltable, or swingable, from an upright position to a leaning position to minimize the potential for turnover of the tricycle during turning maneuvers or riding on rough terrain. Special idler sprockets are provided for the drive chain, to keep the chain in mesh with the drive sprocket when the front frame is in a leaning position.

8 Claims, 3 Drawing Sheets

5,730,453

1
NON-TIPPING TRICYCLE

BACKGROUND OF THE INVENTION

This invention relates to a tricycle, and particularly to a tricycle having means for preventing the tricycle from tipping over during turning maneuvers, or when riding over rough terrain.

In conventional tricycles having two rear wheels and a single front wheel, the front wheel is usually steerable (or turnable) to facilitate turning maneuvers. The rider grips the front handlebars to turn the front wheel, to achieve a turning maneuver.

During a vehicle turning maneuver, the center of gravity of the rider and the tricycle tends to shift in the direction of the turn. As a result, one of the rear wheels tends to lift off the ground. In a worst case scenario, the tricycle can tip over. The rider has the perception that the tricycle is unstable.

My U.S. Pat. No. 5,240,267 discloses a tricycle that overcomes the wheel lift-off problem experienced with conventional tricycles. The tricycle shown in U.S. Pat. No. 5,240,267 comprises separate front and rear frames that have an articulated connection, whereby during a turning maneuver the rider can lean with the front frame in the direction of the turn, but the rear frame wheels remain on the ground.

The tricycle depicted in U.S. Pat. No. 5,240,267 has a belt drive system extending between a pedal-equipped drive pulley and a driven pulley on the cycle front wheel. Since the front wheel is a steerable wheel, a system of guide pulleys is provided on the front frame and on the fork that mounts the front wheel.

SUMMARY OF THE INVENTION

The present invention is directed to a tricycle that includes front and rear frames having an articulated connection, as in the tricycle depicted in U.S. Pat. No. 5,240,267.

The driving force is transmitted by a drive chain from a drive sprocket operably connected to one of the rear wheels. Idler sprockets are provided in proximity to the drive sprocket for maintaining the drive chain meshed with the drive and driven sprockets, especially during a vehicle turning maneuver.

The idler sprockets are floatably supported and resiliently biased toward each other in the plane of the drive sprocket so as to remain operable under all conditions, especially when the drive sprocket tilts with the front frame and the drive sprocket remains parallel to the non-tilting rear wheels. The drive chain necessarily twists between the drive and the driven sprockets, in order to remain in mesh with both sprockets. The idler sprockets proximate to the drive sprocket keep the chain in mesh with the drive sprocket while permitting the chain to twist.

The tilting of the drive sprocket, during a turning maneuver, requires a slight increase in the length of the drive chain envelope. The idler sprockets are floatably mounted to move away from one another in response to increased chain tension. The idler sprockets can thereby produce slight increases in the overall length of the drive chain envelope to accommodate tilting of the drive sprocket.

The present invention is concerned, in part, with a tricycle chain drive system, wherein the chain tension can be maintained within reasonable limits while the length of the drive chain envelope undergoes slight changes, e.g. when the plane of the drive sprocket changes between an upright (vertical) condition and a tilted (acutely angled) condition.

A major aim of the invention is to provide a stable chain-driven tricycle wherein a front frame has an articu-

2
lated connection to a rear frame, and the drive chain is guided and tensioned so as to remain in mesh with the drive sprocket and driven sprocket while the articulating motion is taking place.

The following are some features and advantages of an illustrative embodiment of the invention:

1. A 10 speed chain can be used on this tricycle.
2. The two small idler sprockets are spring loaded to keep the chain tension tight and on the large sprocket, even when the tricycle with rider leans up to 30°.
3. The top small idler sprocket moves upward when pedaling forward. The bottom small idler sprocket takes up the slack on the chain and moves upward.
4. When the pedal arms are reversed by the rider, the rear brakes are applied. This action causes the lower small idler sprocket to drop to a nylon covered drop bar located on the frame. The nylon covered bar prevents noise. The upper small idler sprocket must move down to take up the chain slack.
5. When the rider is traveling fast and leaning up to 30°, then the lower small idler sprocket drops down to allow extra chain length, because at this point the chain must get longer.
6. The chain adjustment for the short chain is located from the axle to the wheel hub area when the hub moved forward.
7. A large chain adjustment, can be accomplished by removing washers from the rear leaning bearing bolt area.
8. A "U" shaped bracket at the front leaning bearing area stays at the same place.
9. Latex rubber bands or a coil spring can be used to restore the two frames to their upright position.

Further features and objectives will become apparent from the attached drawings and descriptions of an illustrative embodiment of the invention.

DESCRIPTION OF THE DRAWINGS

The description refers to the accompanying drawings in which like reference characters refer to like parts throughout the several views and in which.

DESCRIPTION OF THE PREFERRED EMBODIMENT

Figure 1:
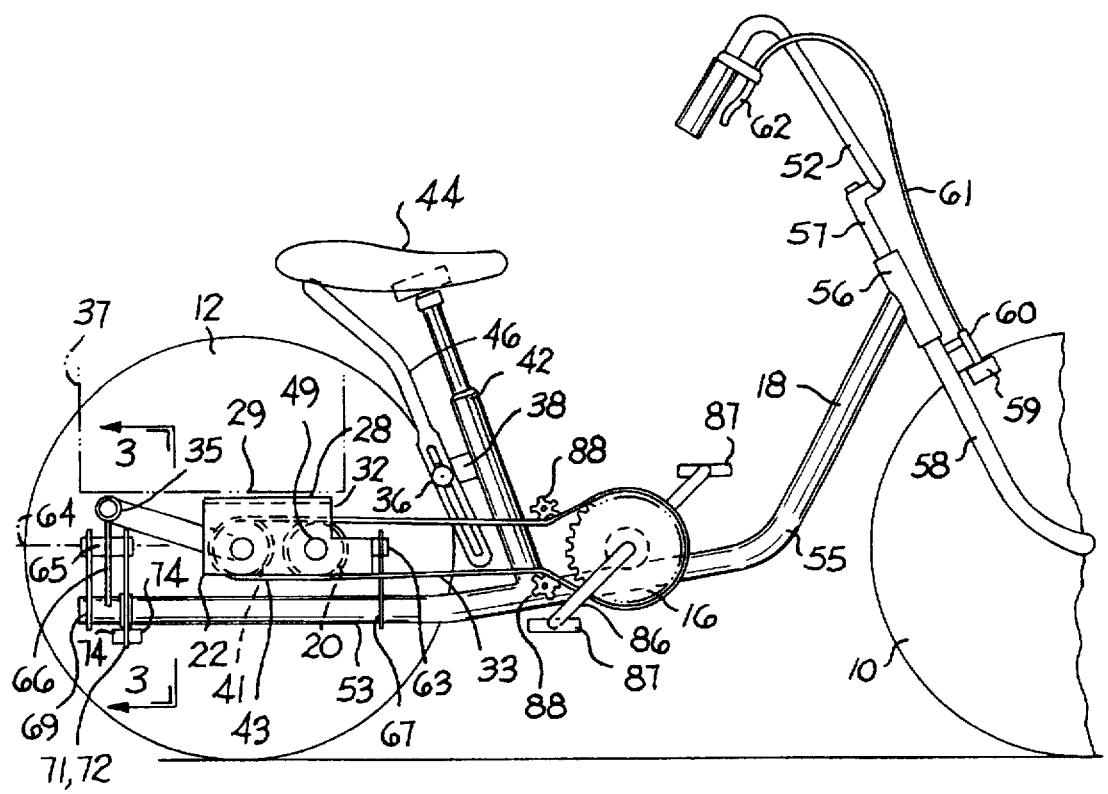
FIG. 1 is a side elevational view of one embodiment of the invention, with one rear wheel of the tricycle removed to illustrate features of the chain drive system.
Figure 2:
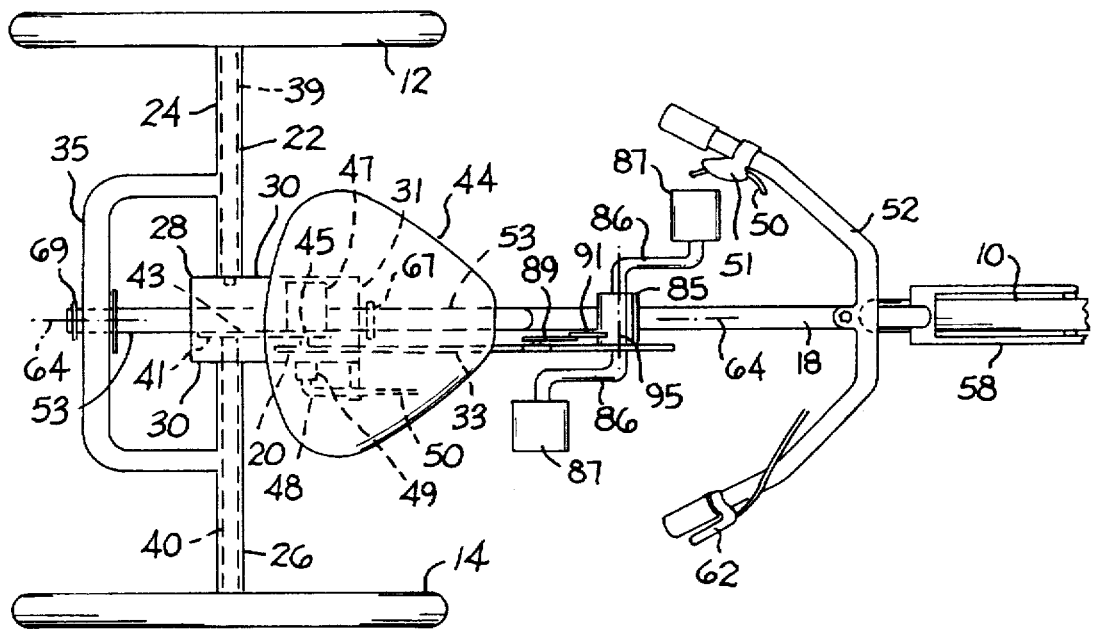
FIG. 2 is a top plan view of the tricycle shown in FIG. 1.

Referring to FIGS. 1 and 2, a preferred chain-driven tricycle includes a front steerable ground wheel 10 and two non-steerable rear ground wheels 12 and 14. The chain driven system comprises a drive sprocket 16 carried on a front frame 18 and a driven sprocket 20 carried on a rear frame 22. Driven sprocket 20 is operatively connected to the right rear wheel 14 of the tricycle. Thus, wheel 14 is the powered wheel of the tricycle; wheels 10 and 12 are non-powered.

Rear frame 22 comprises two tubular frame elements 24 and 26 extending in opposite directions from a heavy sheet steel hood 28. The hood comprises a top wall 29, two side walls 30, and a sliding "U" bracket 31, bolted to the hood on two sides and four places. The bottom, rear and front areas of the hood are left open; additionally the upper front area 32 is left open to permit drive chain 33 to pass out of the hood toward drive sprocket 16.

Rear frame 22 further comprises a U-shaped steel tube 35 having its terminal ends welded to tubes 24 and 26. Tube 35 has an upper surface that is essentially coplanar with the top wall 29 of hood 28, such that a wire basket (not shown) can be mounted on the rear frame by means of screws running through the basket bottom wall into tube 35 and wall 29. In FIG. 1, the outline of a suitable wire basket is shown by dashed lines 37. The basket can be used for containing various items, e.g. groceries or clothing.

Rear ground wheels 12 and 14 have axles 39 and 40 extending coaxially through tubular frame elements 24 and 26 into hood 28. Attached to the inner end of axle 40 is a sprocket 41; a chain 43 is trained around sprocket 41 and a coplanar sprocket 45 coaxial with clutch driven sprocket 20. A speed change drum 47 transmits the drive force from sprocket 20 to sprocket 45. Chain 43 transmits the drive force from sprocket 45 to sprocket 41 and axle 40.

Drum 47 can incorporate therein various combinations of speed and braking, e.g. three speeds with rear wheel braking, a single speed, or a single speed (direct drive) with no braking. Speed control signals are applied to drum 47 by a cable or small chain 48 extending into the drum through a small tubular hub 49 extending outwardly from hood 38 on the drum 47 axis. A Bowden wire 50 extends between a hand-operated control lever mechanism 51 on handlebars 52 and control chain 48, whereby the rider can control the rotational speed (drive ratio) of rear wheel 14.

Front frame 18 comprises a generally horizontal tubular frame element 53 extending underneath rear frame 22, i.e. U-shaped tube 35 and hood 28. The front end portion of tubular frame element 53 angles upwardly, as at 55, to connect with an upright head tube 56. Handlebars 52 comprise a stem structure 57 that extends downwardly through head tube 56 to connect with a front fork structure 58. Front wheel 10 comprises an axle journaled in the lower end of fork structure 58.

Front wheel 10 is a steerable wheel. Handlebars 52 and fork structure 58 are rotatable as a unit around the axis of head tube 56; accordingly, the rider can grip the handlebars and produce a swinging motion of the handlebars to steer front wheel 10.

Front wheel braking can be accomplished by means of friction pads 59 carried by calipers 60 on the fork structure 58. A Bowden wire 61 extends between the calipers and a hand lever 62 on the right handlebar, whereby the rider can squeeze lever 62 to achieve front wheel braking. Friction pads 59 and calipers 60 are omitted from FIG. 2.

Front frame 18 comprises an upstanding tubular post structure 42 that supports the rider's seat 44. The post structure comprises telescopic elements, whereby the height of seat 44 can be adjusted to meet different human requirements. Additionally, a support bar 46 is provided for adjusting the front-to-rear inclination (attitude) of seat 64, to meet user preferences. A carriage bolt 36 extends through a slot in bracket 65 into a plate 38 on post structure 42, to hold the bracket in selected positions of adjustment.

Seat 44 and handlebars 52 are mounted on front frame 18 and fork 58. The front frame has an articulated (swingable) connection to the rear frame 22. The articulated connection comprises two aligned pivot shafts 63 and 65 located on the longitudinal centerline of the tricycle in intersecting relation to the rotational centerline of drive sprocket 16. In FIG. 1, the axis of the two aligned pivot shafts 63 and 65 with hex bolts 80 is designated by numeral 64.

Figure 7:
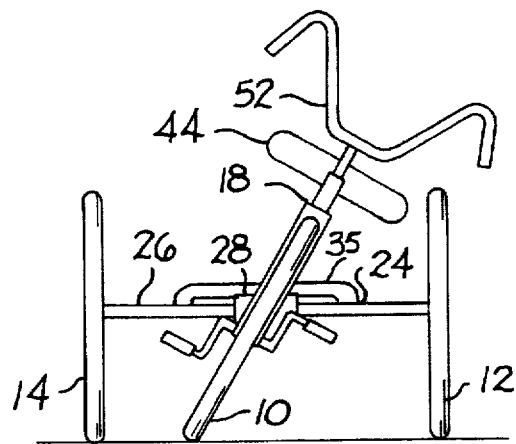
FIG. 7 is a diagrammatic front view of the FIG. 1 tricycle taken on a reduced scale, with the front frame of the tricycle in a leaning condition.
Figure 6:
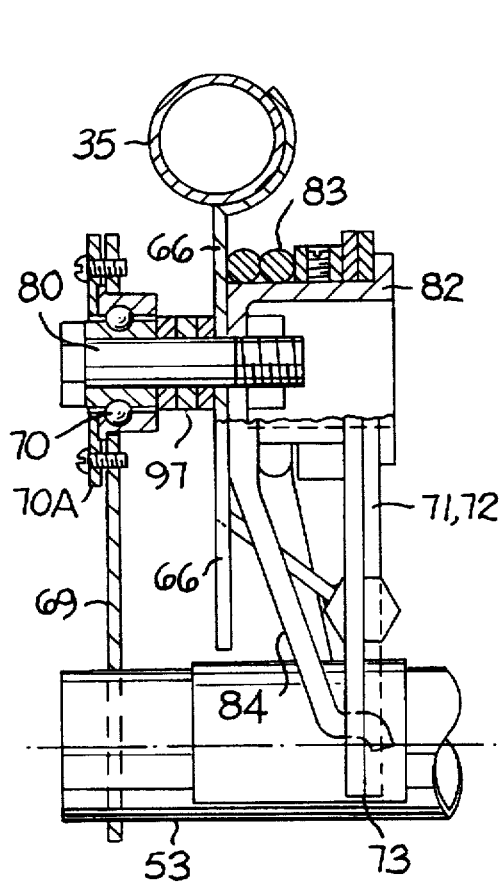
FIG. 6 is a side elevational view, with parts in section, of the frame gripper device shown in FIG. 5.

Pivot shaft 63 projects forwardly from the "U" bracket in front wall of hood 28. Pivot shaft 65 is affixed to a bracket 66 that depends from U-shaped tube 35. Suspension plates 67 and 69 extend upwardly from horizontal tubular frame element 53 in pivotal relationship to the respective pivot shafts 63 and 65. Plate 69 depends from a ball bearing 70 which is mounted on shaft 65 and held in position by bracket 70A (FIG. 6). The front suspension plate 67 is similarly carried on a ball bearing, not shown. The front frame 18 is thereby swingably connected to rear frame 22 for pivotal motion around swing axis 64. FIG. 7 shows the condition of front frame 18 at its maximum limit of swing (or lean) relative to the rear frame 22. Swinging motion of frame 18, in either direction, can be about thirty degrees, measured around swing axis 64.

The leaning attitude depicted in FIG. 7 can be achieved by the rider shifting his/her weight in the direction of the lean, as on bicycles.

As the rider turns the handlebar to execute a turning maneuver in the direction of the lean, weight shift prevents the rear wheels from lifting off the ground. The rider is thus assured that the vehicle is safe and not in danger of overturning during a turning maneuver or when riding on rough terrain. The vehicle can be turned to the right or the left, with the same degree of assurance and safety.

Figure 3:
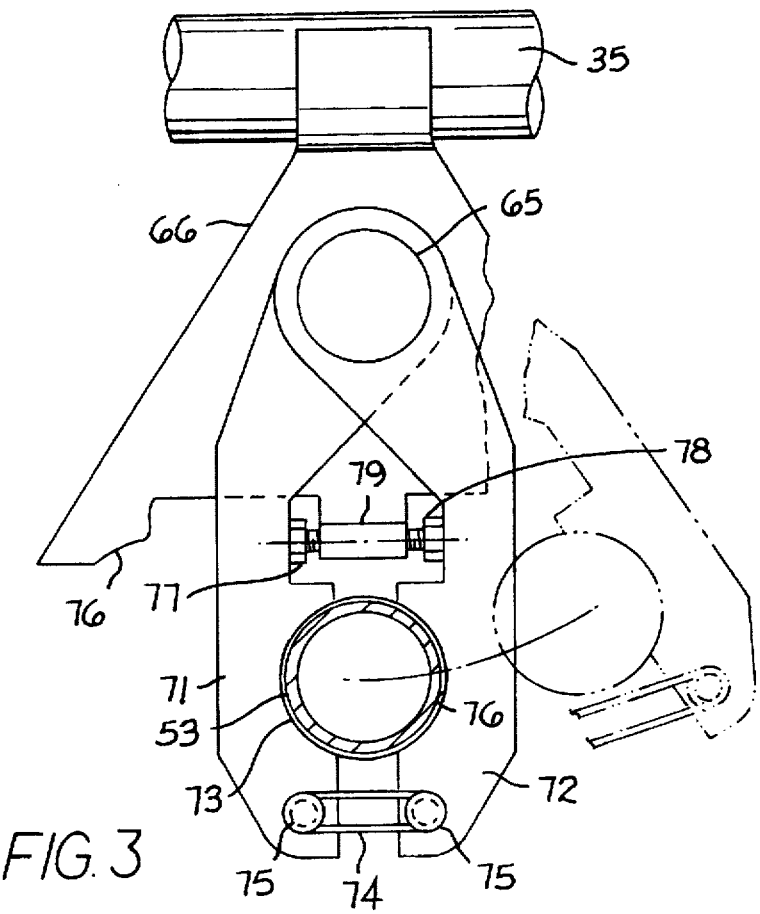
FIG. 3 is a fragmentary transverse sectional view taken on line 3—3 in FIG. 1.

In order to prevent undesired wobble of the front frame around swing axis 64 when the tricycle is moving straight ahead (or is stationary), a frame gripper system is provided at the rear end of tubular frame element 53. FIG. 3 illustrates some features of the frame gripper mechanism (which is similar to a gripper device shown in U.S. Pat. No. 5,240, 267).

The gripper mechanism comprises two arms 71 and 72 swingably mounted on pivot shaft 65 and having concave surfaces adapted to grip nylon sleeve 73 on tubular frame element 53. Two heavy elastomeric bands 74 are trained around pins 75 that project from the major surfaces of arms 71 and 72. The bands bias the arms toward the sleeve 73 surface. Sufficient gripper force is provided to maintain front frame 18 in an upright (vertical) position when the tricycle is stationary or is moving in a straight-ahead direction. Suspension plate 69 has a pair of stop surfaces 76 for limiting swinging motion of the tubular frame element 53 during a turning maneuver. A pair of aligned, adjustable threaded members 77 and 78 are mounted on a sleeve 79 between the two arms for stopping their inward motion toward sleeve 73.

Figure 5:
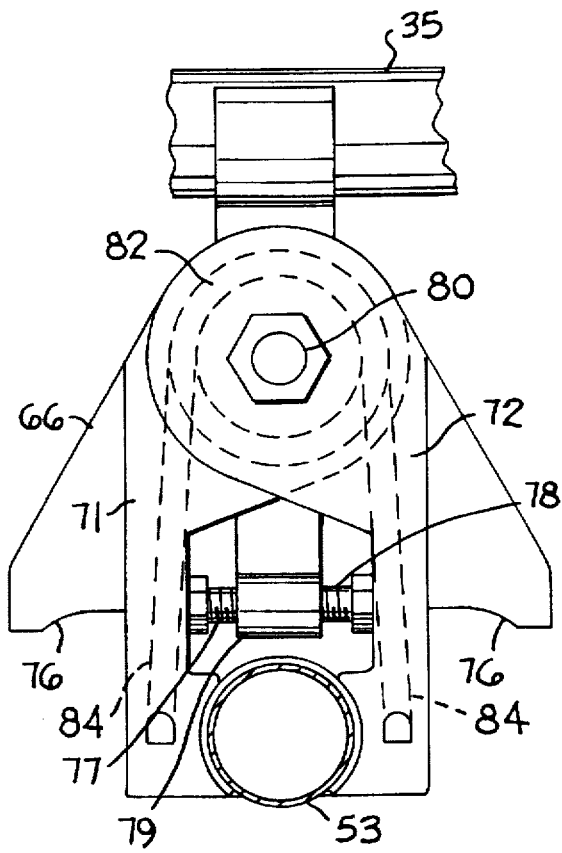
FIG. 5 is a view taken in the same direction as FIG. 3, but illustrating an alternative frame gripper device that can be used in practicing the invention.

FIGS. 5 and 6 illustrate an alternative frame gripper mechanism that can be used in practice of the invention. In this case tubular frame element 53 is swingably connected to a bolt 80 that forms a pivot shaft for the articulated connection. A cylindrical cup-shaped brass element 82 is clamped to bolt 80 and bracket 66 to form a mounting surface for a heavy wire spring 83. Spring 83 comprises two turns (coils) encircling cup-shaft element 82, and two essentially straight ends 84 attached to the gripper arms 71 and 72, whereby the gripper arms are biased toward the sleeve on tubular frame element 53.

Three spacer washers 97 are provided on bolt 80, for the purpose of chain adjustment. By increasing the number of spacers it is possible to decrease the length of the chain envelope. Reducing the number of spacers increases the length of the chain envelope.

The gripper system of FIGS. 5 and 6 functions in essentially the same fashion as the gripper system shown in FIG. 3. The wire spring performs a similar function to elastomeric bands 74.

FIGS. 1 and 2 illustrate some features of the pedal mechanism used to power the drive sprocket 16. The sprocket is mounted for rotation in a hub 85 that is affixed to the front frame 18. Crank arms 86 extend from the sprocket 16 shaft to support foot pedals 87.

During a turning maneuver the plane of drive sprocket 16 is acutely angled to the plane of driven sprocket 20 (as will be apparent from FIG. 7). Drive chain 33 thus twists in the area between the drive and driven sprockets. In order to keep the chain in proper mesh with the teeth on drive sprocket 16, two idler sprockets 88 are provided in the plane of drive sprocket 16.

Figure 4:
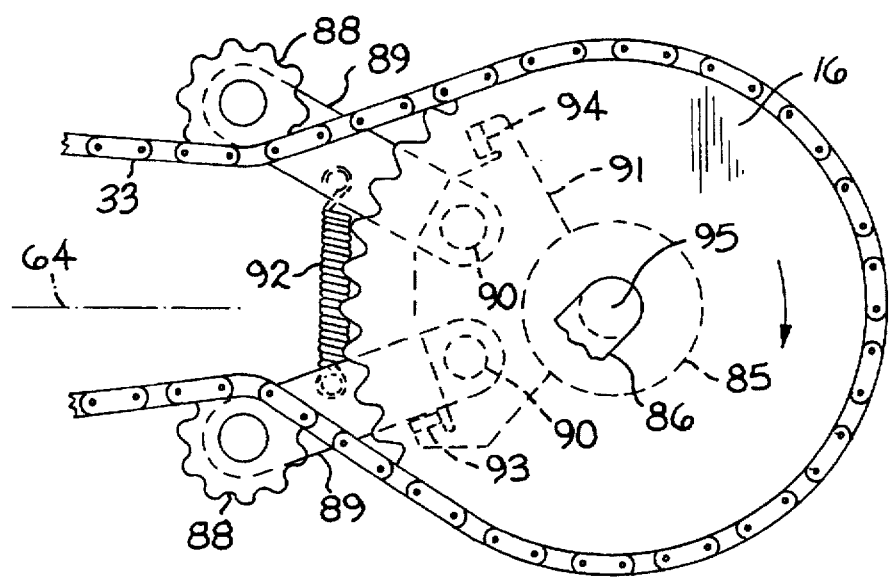
FIG. 4 is a fragmentary side elevational view of a drive sprocket and chain-controlling idler sprocket system in neutral position used in the FIG. 1 tricycle.

As shown in FIG. 4, each idler sprocket 88 is rotatably supported on an arm 89 that has a pivotal connection 90 with a bracket plate 91 affixed to hub 85. A tension coil spring 92 extends between arms 89 to bias the idler sprockets 88 toward each other, and into mesh with the drive chain 33. The two idler sprockets operatively exert a squeezing action on the upper and lower runs of the chain, such that the chain wraps around the drive sprocket 16 for an arcuate distance greater than two hundred forty degrees, measured around the drive sprocket axis. This wrap-around action helps to keep the drive chain in proper mesh with the teeth on drive sprocket 16 when the drive sprocket plane is angled relative to the plane of driven sprocket 20 (e.g. during a turning action).

During normal pedal motion, the drive sprocket rotates clockwise, as seen in FIG. 4, such that the lower run of the chain exerts a downward force on the lower idler sprocket 88. A stop lug (flange) 93 on plate 91 limits the downward motion of the lower arm 89 to the position depicted in FIG. 4. The tension spring 92 pulls the upper idler sprocket into mesh with the upper run of the chain.

During the change in angulation of the drive sprocket plane (i.e. during a turning maneuver) the length of the drive chain envelope has to increase slightly, to achieve the previously noted twist in the chain, and to keep the chain in mesh with the teeth on drive sprocket 16. Such increase in the drive chain envelope length is accomplished by an automatic lifting of the upper idler sprocket 88. An increase in the chain tension tends to straighten the upper run of the chain, which lifts the upper idler sprocket 88 and lower idler. A stop lug 94 on bracket plate 91 limits the upward swing of the associated arm 89, whereby the upper idler sprocket 88 is kept in mesh with the chain.

The drive sprocket rotational axis 95 intersects the fame swing axis 64 so that during angular changes in the plane of the drive sprocket the upper and lower runs of the chain are equidistant from the plane of the driven sprocket 20. The upper and lower runs of the chain are subjected to approximately the same stress and deflection, such that the twisting forces on the chain have minimal tendency to disengage the chain from sprocket 16 or sprocket 20. Idler sprockets 88 remain in the plane of drive sprocket 16 at all times, so that the chain has a reduced tendency to disengage from sprocket 16. Tension spring 92 keeps the idler sprockets 88 in mesh with the chain while at the same time permitting the length of the chain envelope to increase slightly when the drive sprocket plane is acutely angled to the plane of driven sprocket 20.

If desired, a chain guide bracket (not shown) can be provided at the front end of the rightmost hood wall 30 (in FIG. 2) to guide the lower run of the drive chain as it enters hood 28. Such a guide bracket (not shown) is preferably formed of nylon or other plastic that provides a noise-free guide action.

The tricycle depicted in the drawing is powered by foot pressure applied to the pedals associated with drive sprocket 16. However, the tricycle can be modified or adapted for motor-powered propulsion. A battery and electric motor could be mounted on the rear frame to provide power for the axle associated with rear wheel 12 or rear wheel 14. The invention is however particularly concerned with chain drive features used in the manual foot-powered operational mode.

The drawings necessarily show a specific form of the invention. However, it will be appreciated that the invention can be practiced in various forms and structural configurations. It will be appreciated that a chain guard and other safety features can be incorporated into the tricycle.

Having described my invention, I claim:

1. A tricycle comprising:

two rear ground wheels;

a rear frame means supporting said rear ground wheels for rotary movements;

a single front ground wheel;

a front frame means that includes an upstanding head tube;

means for steering said front wheel, comprising a handlebar means and a front fork means rotatably supported by said head tube;

said front frame means comprising a horizontal frame element extending underneath said rear frame means;

hanger means swingably suspending said horizontal frame element for pivotal motion around a horizontal axis located midway between said rear ground wheels;

seat means carried by said front frame means for supporting a rider in an upright position behind said handlebar means, whereby the rider can turn the handlebars and shift his weight to swing said front frame means in order to turn the tricycle without tipping the rear frame means;

means for driving one of said rear wheels;

said drive means comprising a drive sprocket rotatably mounted on said front frame means, a driven sprocket rotatably mounted on said rear frame means, and an endless drive chain trained around said drive sprocket and said driven sprocket for transmitting a drive force from the drive sprocket to the driven sprocket;

said drive sprocket having a rotation axis extending transverse to said frame element suspension axis; and said drive sprocket rotation axis and said frame element suspension axis intersecting so that when the drive sprocket plane is acutely angled to the driven sprocket plane the drive chain is twisted in opposite directions at the points where it enters and leaves the drive sprocket.

2. The tricycle of claim 1, and further comprising two idler sprockets mounted on said front frame means in near proximity to said drive sprocket, said idler sprockets being located in the plane of said drive sprocket in all conditions of said front frame means so as to keep said drive chain in mesh with said drive sprocket.

3. The tricycle of claim 2, and further comprising yieldable spring means biasing the two idler sprockets toward each other, whereby said idler sprockets can move away from each other when the plane of said drive sprocket is acutely angled to the plane of said driven sprocket.

4. A tricycle comprising:

two rear ground wheels;

a rear frame means supporting said rear ground wheels for rotary movements;

a single front ground wheel;

a front frame means that includes an upstanding head tube;

means for steering said front wheel, comprising a handlebar means and a front fork means rotatably supported by said head tube;

said front frame means comprising a horizontal frame element extending underneath said rear frame means;

hanger means swingably suspending said horizontal frame element for pivotal motion around a horizontal axis located midway between said rear ground wheels;

seat means carried by said front frame means for supporting a rider in an upright position behind said handlebar means, whereby the rider can turn the handlebars and shift his weight to swing said front frame means in order to turn the tricycle without tipping the rear frame means;

means for driving one of said rear wheels;

said drive means comprising a hub carried by said front frame means at the front end of said horizontal frame element, a drive sprocket rotatably mounted on said hub, a driven sprocket rotatably mounted on said rear frame means, and an endless drive chain trained around said drive sprocket and said driven sprocket for transmitting a drive force from the drive sprocket to the driven sprocket; and a bracket means associated with said hub; first and second arms pivotably connected to said bracket means; and first and second idler sprockets rotatably supported on respective ones of said arms in the plane of the drive sprocket for keeping said drive chain in mesh with said drive sprocket.

5. The tricycle of claim 4, wherein said idler sprockets are spaced apart so that the drive chain is in mesh with the drive sprocket for at least two hundred forty degrees measured around the drive sprocket axis.

6. The tricycle of claim 4, and further comprising a tension spring extending between said first and second arms for yieldably biasing said arms toward one another; at least one of said arms being freely movable to increase the length of the drive chain envelope when the plane of said drive sprocket is acutely angled to the plane of said driven sprocket.

7. The tricycle of claim 6, wherein said drive sprocket has a rotation axis extending transverse to said frame suspension axis, and said driven sprocket has a rotation axis extending transverse to said frame suspension axis; said first idler sprocket being located above an imaginary line connecting the drive sprocket rotation axis and the driven sprocket rotation axis; said second idler sprocket being located below the imaginary line connecting the drive sprocket rotation axis and the driven sprocket rotation axis.

8. The tricycle of claim 7, wherein said idler sprockets are spaced apart a lesser distance than the diameter of said drive sprocket.

* * * * *